US009946995B2

(12) United States Patent
Dwyer et al.

(10) Patent No.: US 9,946,995 B2
(45) Date of Patent: Apr. 17, 2018

(54) SYSTEM AND METHOD FOR COLLECTING CLEARING INFORMATION FOR IMPLEMENTING A GLOBAL ELECTRONIC FUNDS TRANSFER

(71) Applicant: Bottomline Technologies (DE) Inc., Portsmouth, NH (US)

(72) Inventors: Nicole Pierrette Dwyer, Dover, NH (US); Nicholas Anthony Griffin, Dover, NH (US); Michael Alan Vigue, Wells, ME (US); Eric Campbell, Rye, NH (US)

(73) Assignee: BOTTOMLINE TECHNOLOGIES (DE) INC., Portsmouth, NH (US)

( * ) Notice: Subject to any disclaimer, the term of this patent is extended or adjusted under 35 U.S.C. 154(b) by 833 days.

(21) Appl. No.: 13/833,602

(22) Filed: Mar. 15, 2013

(65) Prior Publication Data
US 2014/0279414 A1   Sep. 18, 2014

(51) Int. Cl.
*G06Q 20/10*   (2012.01)
*G06Q 20/02*   (2012.01)

(52) U.S. Cl.
CPC ........... *G06Q 20/10* (2013.01); *G06Q 20/023* (2013.01)

(58) Field of Classification Search
CPC ...... G06F 3/14; G06F 17/30899; G06F 15/16; G06F 9/445; G06F 9/44
USPC .............................................. 715/738; 705/39
See application file for complete search history.

(56) References Cited

U.S. PATENT DOCUMENTS

| 7,716,590 | B1 * | 5/2010 | Nathan | G06F 17/30899 715/738 |
| 9,003,312 | B1 * | 4/2015 | Ewe | G06F 8/38 715/744 |
| 2002/0016769 | A1 * | 2/2002 | Barbara | G06Q 20/04 705/40 |
| 2002/0135614 | A1 * | 9/2002 | Bennett | G06F 17/30867 715/745 |
| 2002/0188619 | A1 * | 12/2002 | Low | G06F 17/30899 |
| 2003/0184590 | A1 * | 10/2003 | Will | G06F 3/14 715/781 |
| 2005/0177495 | A1 * | 8/2005 | Crosson Smith | G06Q 20/02 705/39 |
| 2005/0177504 | A1 * | 8/2005 | Crosson Smith | G06Q 20/10 705/40 |
| 2005/0177521 | A1 * | 8/2005 | Crosson Smith | G06Q 20/10 705/67 |
| 2006/0015822 | A1 * | 1/2006 | Baig | G06F 3/0489 715/810 |

(Continued)

*Primary Examiner* — Lindsay M Maguire
*Assistant Examiner* — Michael J Warden
(74) *Attorney, Agent, or Firm* — Renner, Otto, Boisselle & Sklar, LLP; Grant J. Steyer

(57) ABSTRACT

A system and method is presented for receiving required information (i.e., clearing information) for performing a global electronic funds transfer. The system and method generates a form for receiving the clearing information from a user. The form includes clearing information fields that are each configured to accept an element of clearing information. The clearing information fields of the form are dynamically updated based on clearing information rules. The clearing information rules define a relationship between at least one of the clearing information fields and the clearing information received from the user. The dynamically updated form is provided to the user to input further clearing information.

14 Claims, 12 Drawing Sheets

(56) References Cited

U.S. PATENT DOCUMENTS

| | | | |
|---|---|---|---|
| 2006/0080245 A1* | 4/2006 | Bahl | G06Q 20/04 705/40 |
| 2006/0200767 A1* | 9/2006 | Glaeske | G06Q 10/10 715/700 |
| 2006/0265662 A1* | 11/2006 | Gertzen | G06F 9/4443 715/760 |
| 2007/0266176 A1* | 11/2007 | Wu | G06F 17/2247 709/242 |
| 2009/0150814 A1* | 6/2009 | Eyer | G06F 3/04842 715/765 |
| 2011/0302485 A1* | 12/2011 | D'Angelo | G06Q 10/10 715/234 |
| 2012/0054095 A1* | 3/2012 | Lesandro | G06Q 20/10 705/39 |
| 2012/0197795 A1* | 8/2012 | Campbell | G06Q 30/04 705/42 |
| 2012/0290382 A1* | 11/2012 | Martin | G06Q 20/10 705/14.34 |
| 2012/0290474 A1* | 11/2012 | Hoke | G06Q 30/04 705/40 |
| 2012/0290479 A1* | 11/2012 | Hoke | G06O 20/10 705/44 |
| 2014/0241609 A1* | 8/2014 | Vigue | G06Q 20/042 382/138 |
| 2014/0244491 A1* | 8/2014 | Eberle | G06Q 20/102 705/40 |
| 2014/0258104 A1* | 9/2014 | Harnisch | G06Q 20/102 705/40 |
| 2014/0279484 A1* | 9/2014 | Dwyer | G06Q 20/108 705/42 |

* cited by examiner

FIG. 2A

Create Payment

Clearing Method *
[ | ▶ ] — 32
AU-DE
CA-EFT
NACHA

Create Payment ACH – CA-EFT

☐ Originator Information

Originator ID/Name *  [000000003 / Canadian EFT-CAD-Payroll] — 32a
Description             [                                   ] — 32b    } 36a
Destination Currency *  [CAD ▶] — 32c
Internal Memo           [                                   ] — 32d
Value Date *            [1/22/2013] ☐ — 32e

30

Create Payment ACH -- AU-DE

☐ Originator Information

Direct Entry ID * | Australia DE / 0000000004
Batch Name * | --Select--
Funds Account Number * | 1/30/2013
Value Date *
Hours * | --Select-- | Min * | --Select--

Create Payment ACH – CA-EFT

| Originator ID/Name * | 000000000003 / Canadian EFT-CAD-Payroll | — 32a |
| Description | | — 32b |
| Destination Currency * | CAD ▶ | — 32c |
| Internal Memo | | — 32d |
| Value Date * | 1/22/2013 ▣ | |

— 36a

32e —

|   | S | M | T | W | T | F | S |
|---|---|---|---|---|---|---|---|
|   | 30 | 31 | 1 | 2 | 3 | 4 | 5 |
|   | 6 | 7 | 8 | 9 | 10 | 11 | 12 |
|   | 13 | 14 | 15 | 16 | 17 | 18 | 19 |
|   | 20 | 21 | 22 | 23 | 24 | 25 | 26 |
|   | 27 | 28 | 29 | 30 | 31 | 1 | 2 |
|   | 3- | 4 | 5 | 6 | 7 | 8 | 9 |
|   | 2012 | | January ▶ | | 2013 | | 2014 |

| Clearing Information Rule 002 50b | |
|---|---|
| If clearing method == AU-DE | Create new section "Originator Information"<br>    Add fields: "direct entry ID" as a textbox, "value date" as a drop bown calendar, "hours" as a drop down list, "min" as a drop down list, "batch name" as a textbox, "funds account number" as a drop down list, "funds account name" as a textbox, "funds BSB" as a textbox, "funding method" as a textbox, "statement reference" as a textbox, and "statement narrative" as a text box.<br>    Add subsection "Default Information" containing fields: "remitter name" as a textbox, "trade account number" as a drop down list, "trace BSB" as a textbox, "lodgement reference" as a textbox, "transaction code" as a drop down list", and "transaction description" as a textbox.<br>Create new section "Beneficiary Information"<br>    Add subsection "Beneficiary" containing field "remitter name" as a textbox.<br>    Add subsection "Payee Information" containing fields: "item number" as a textbox, "status" as a textbox, "amount" as a textbox, "transaction code" as a drop down list, "transaction description" as a textbox, "hold" as a checkbox, "withholding tax indicator" as a drop down list, "withholding tax amount" as a textbox, and "internal memo" as a textbox"<br>    Add subsection "Payee Details" containing fields: "amount" as a textbox, "value date" as a drop down calendar, "transaction code" as a drop down list, and "transaction description" as a textbox.<br>    Add subsection "Receiver Information" containing fields: "company location name" as a textbox, "customer account no." as a textbox, "company BSB" as a drop down list, and "lodgement reference" as a text box. |

80b { (top bracket)

82b { (bottom bracket)

FIG. 4C

Create Payment ACH – Cash Concentration/Disbursement

Expand All Sections          Create From Existing          ○ Payment          ○ Template ☐ Payment Information — 66

Payment Method *    | ACH |
Payment Type*       | Cash Concentration/Disbursement |  ▶ — 32a
Clearing Method *   | |  ▶ — 32b
                                                          ▶ — 32c
AU-DE
CA-EFT
NACHA ↻ Reset    → Continue

Create Payment ACH – Payroll – CA-EFT

Expand All Sections

- ☐ Originator Information
  - 68
  - Originator ID/Name *  0000000003 / Canadian EFT-CAD-Payroll
  - Description
  - Destination Currency *  CAD
  - Internal Memo

- ☐ Default Information
  - 70
  - Value Date *  1/30/2013
  - Transaction Code *  --Select--
  - Description

- ☐ Beneficiary Information
  - 64
  - ⊖ Summary View   ⊕ Save and Add Another   ⊖ View Previous Beneficiary   ⊕ View Next Beneficiary

- ☐ Payee Information
  - 72
  - Originator Short Name *  Canadian EFT
  - Originator Full Name  Canadian EFT

- ☐ Payment Details
  - 74
  - Amount *  0.00   Currency  CAD
  - Value Date *  1/30/2013
  - Transaction Code *  --Select--
  - Transaction Description

- ☐ Receiver Information
  - 76
  - Customer Name *
  - Customer Account No *
  - Customer ID
  - Bank ID/Transit *  --Select--
  - Bank Name
  - Sundry Information

[→ Continue]  [↻ Reset]  [← Cancel]

Create Payment ACH – Payroll – AU-DE

Expand All Sections

☐ Payment Information

66 — Payment Method *   ACH ▶
Payment Type*   Payroll ▶
Clearing Method *   AU-DE ▶

☐ Originator Information

68 —
Direct Entry ID *   Australia DE / 0000000004   ▶   🗝
Value Date *   1/30/2013 ▶   ☐ Min *
Hours *   --Select-- ▶   --Select-- ▶
Batch Name *
Funds Account Number *   --Select-- ▶   🗝
Funds Account Name
Funds BSB
Funding Method
Statement Reference
Statement Narrative ☐ Default Information

70 —
Remitter Name *
Trade Account Number *   --Select-- ▶   🗝
Trade Account Name *
Trace BSB
Lodgement Reference *
Transaction Code *   --Select-- ▶   🗝
64 — Transaction Description *

☐ Beneficiary Information

[→ Continue]  [↻ Reset]  [← Cancel]

SYSTEM AND METHOD FOR COLLECTING CLEARING INFORMATION FOR IMPLEMENTING A GLOBAL ELECTRONIC FUNDS TRANSFER

TECHNICAL FIELD

The present invention relates to providing financial transaction processing services, and more particularly, to a system and method for receiving clearing information for implementing a funds transfer.

BACKGROUND

Banks and other financial institutions utilize websites to allow customers to obtain online access to their accounts. However, bank websites often lack support for less popular types of financial transactions. Infrequently performed transactions are often not supported, because it is not cost effective for banks to support diverse financial transactions due to a low volume of usage by customers. Recently, supplemental financial transaction systems have been developed that enable banks to support greater numbers of financial transactions without requiring a bank to upgrade its website and/or servers.

While supplemental financial transaction systems may enable banks to support a greater number of financial transactions, they do not currently provide a convenient means for generating global electronic funds transfers for international clients in countries outside the United States. Additionally, bank customers may be unfamiliar with the information required to perform an electronic funds transfer in a different country.

Therefore, there exists a need for a supplemental financial transaction system that provides a means for generating a global electronic funds transfer.

SUMMARY

The present invention provides a system for receiving clearing information (i.e., required information) for implementing a global electronic funds transfer.

A first aspect of the present invention relates to a global electronic funds payment system for receiving clearing information for implementing a funds transfer. The clearing information includes required information for performing the funds transfer. The system includes a processor, a network interface, and a database. The processor is configured to generate a form for accepting clearing information. The form includes clearing information fields. Each clearing information field is configured to accept clearing information. The network interface is configured to provide the form to a user and receive the clearing information from the user. The database is encoded to a non-transitory computer readable medium. The database includes at least one clearing information rule defining a relationship between at least one of the clearing information fields and the clearing information received from the user. The processor is further configured to analyze the clearing information received from the user in relation to the at least one clearing information field by applying the at least one clearing information rule, and based thereon dynamically update another of the clearing information fields. The network interface is further configured to provide the dynamically updated form to the user and receive further clearing information.

The global electronic funds payment system may be part of a supplemental financial transaction system.

Dynamically updating the form may include at least one of removing a specified clearing information field from the form and adding the specified clearing information field to the form.

Dynamically updating the form may further include populating the specified clearing information field.

The clearing information fields may be grouped into sections and new sections may be added to the form as clearing information fields are added.

Within a section, the clearing information fields may be interrelated.

The clearing information fields may be grouped into sections related to at least one of payment information, originator information, default information, beneficiary information, payee information, payment details, and receiver information.

A user may enter clearing information in a given clearing information field using at least one of a drop down list, a drop down calendar, a text box, a check box, and a radio button.

Dynamically updating the form may include modifying how the user enters clearing information in the given clearing information field.

Dynamically updating the form may include modifying selectable clearing information available in a given clearing information field.

The clearing information may include at least one of payment method, payment type, and clearing method.

The clearing information may include the clearing method and the clearing method may include at least one of Canadian Electronic Funds Transfer (EFT), Australian Direct Entry, New Zealand Bulk Electronic Clearing System (BEGS), United Kingdom (UK) Bankers' Automated Clearing Services (Bacs), and UK Faster Payments.

Upon receiving clearing information including the clearing method, the processor may apply a given clearing information rule that results in the addition of at least one specified clearing information field to the form for accepting the clearing information required to perform the funds transfer according to the clearing method.

The system may implements an electronic funds transfer based on the clearing information.

The system may provide the clearing information to a bank's transaction processing system for performing an electronic funds transfer based on the clearing information.

The funds transfer may be an ACH payment.

The form may include a user interface displayed to a user.

For a better understanding of the present invention, together with other and further aspects thereof, reference is made to the following description, taken in conjunction with the accompanying drawings. The scope of the invention is set forth in the appended claims, which set forth in detail certain illustrative embodiments. These embodiments are indicative, however, of but a few of the various ways in which the principles of the invention may be employed.

BRIEF DESCRIPTION OF THE DRAWINGS

FIGS. 2A-2E are exemplary screen shots of a form and updating of the form based on clearing information rules;

FIGS. 4A-4C are schematic diagrams depicting exemplary clearing information rules stored in a database;

FIGS. 5A-5C are exemplary screen shots of a form and updating of the form based on the clearing information rules of FIGS. 4A-4C.

DETAILED DESCRIPTION

Figure 1:
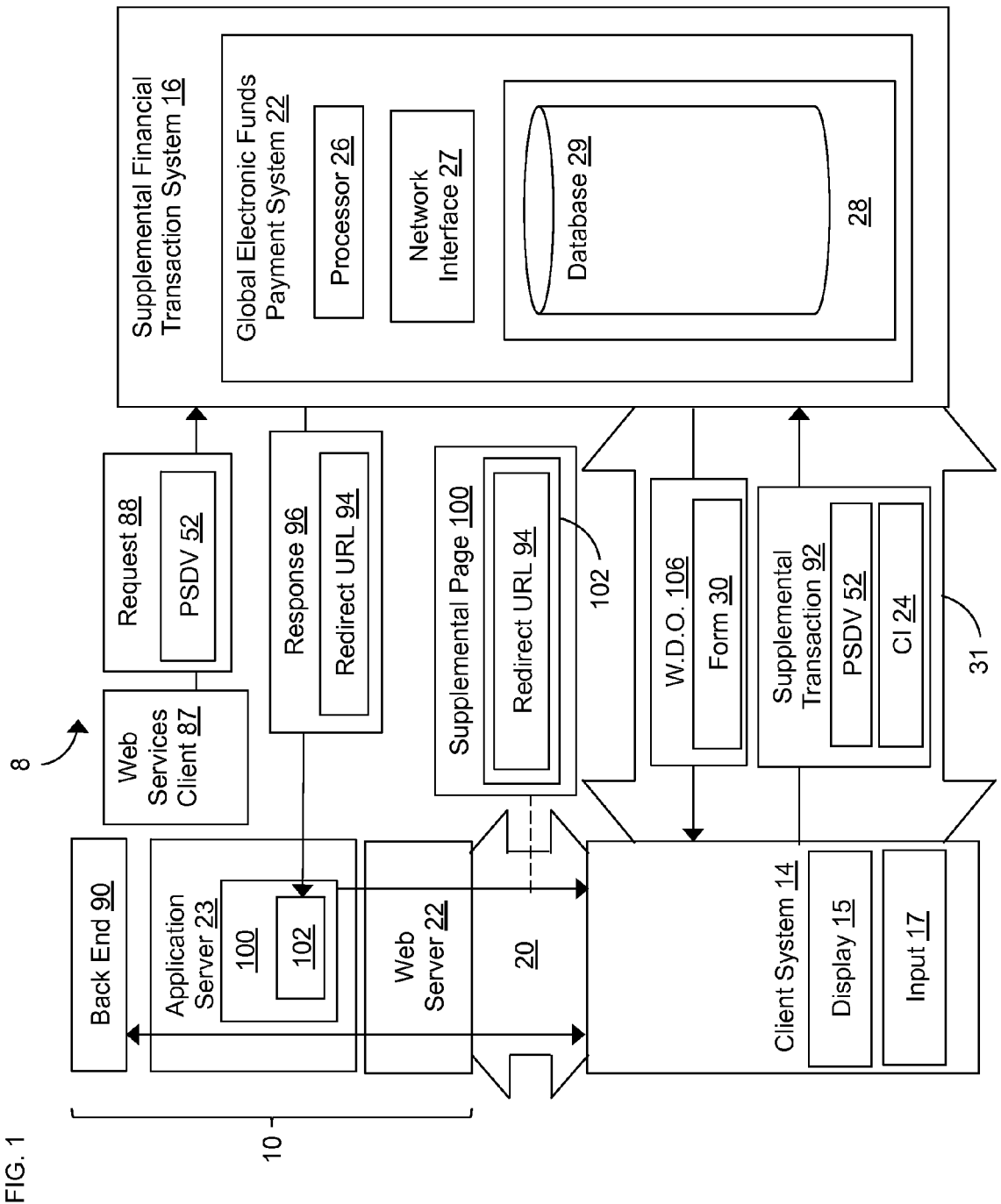
FIG. 1 is a block diagram of an exemplary system for receiving clearing information for implementing a funds transfer.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The present invention provides a system and method for receiving required information (i.e., clearing information) for performing a global electronic funds transfer. For example, the system and method may be configured to receive required information for performing an in country payment in multiple different countries. The system and method generate a form for receiving the clearing information from a user. The form includes clearing information fields that are each configured to accept an element of clearing information. The clearing information fields of the form are dynamically updated based on clearing information rules. The clearing information rules define a relationship between at least one of the clearing information fields and the clearing information received from the user. The dynamically updated form is provided to the user to input further clearing information.

Turning to FIG. 1, an exemplary architecture 8 including a primary financial services system 10, a client system 14, and a supplemental financial transaction system 16 are shown. When operated by a user with applicable authentication credentials for the primary financial services system 10, the client system 14 may establish a secure connection 20 to a web server 22 of the primary financial services system 22 and obtain web access to entitled banking accounts maintained by, and services offered by, a financial institution operating the primary financial services system 22. A secure web application server 23 of the primary financial services system 22 may enable the client system to perform core function (e.g., viewing account balances, printing statements, etc.) However, the primary financial services system 22 may not support supplemental financial transactions (e.g., initiating wire transfers).

The supplemental financial transaction processing system 16 provides support for supplemental financial transactions that are not supported by the primary financial services system 22. That is, the supplemental financial transaction processing system 16 allows a user to perform supplemental financial transactions that are not supported by the primary financial services system 22.

An exemplary supplemental financial transaction system is further described in U.S. Pat. No. 7,805,370 filed on Apr. 29, 2009, the entire contents of which are incorporated by reference herein.

Again referring to FIG. 1, the supplemental financial transaction system 16 includes a global electronic funds payment system 22. The global electronic funds payment system 22 may provide functionality for receiving clearing information 24 for implementing a global electronic funds transfer. The global electronic funds payment system 22 may be a sub-system of the supplemental financial transaction system 16. The global electronic funds payment system 22 may be a computer system of one or more servers including at least a processor 26, a network interface 27, and computer readable medium 28. The computer readable medium 28 may include encoded thereon a database 29. The database 29 may include data structures, also referred to as tables, as described herein and may include instructions embodied on computer readable medium 28 for interfacing with the network interface 27 and for reading and writing data to the database 29.

The processor 26 may be configured to (1) generate a form 30 for accepting clearing information 24, (2) analyze the clearing information 24 received from the user, and (3) dynamically update the form 30. The processor 26 may generate the form 30 using an initial form template, a clearing information rule 50, or using any other suitable means.

Turning to FIG. 2A, an exemplary form 30 is depicted. The form 30 may comprise a user interface displayed to the user, a web page, a frame of a web page, an applet, an HTML form, or any other suitable means for receiving user-entered information. The form 30 includes at least one clearing information field 32. The at least one clearing information field 32 may comprise a textbox, a drop down list, a drop down calendar, a checkbox, a radio button, or any suitable field for receiving data entered by a user.

As depicted in the forms of FIGS. 2B and 2C, the clearing information fields 32c-32k may be grouped into sections 36a, 36b. The sections 36a, 36b may comprise interrelated clearing information fields 32. As the form 30 is updated to include new clearing information fields 32c-32k, the new clearing information fields 32 may be added to new sections 36, added to existing sections 36, or may not be included in a section. Alternatively, as the form 30 is updated to remove clearing information fields 32, clearing information fields 32 may be removed from existing sections 36 or sections 36 may be removed. Sections 36 may include clearing information fields 32 related to at least one of payment information, originator information, default information, beneficiary information, payee information, payment details, and receiver information. The clearing information fields 32 may be further divided into subsections within a section.

Figure 2E:
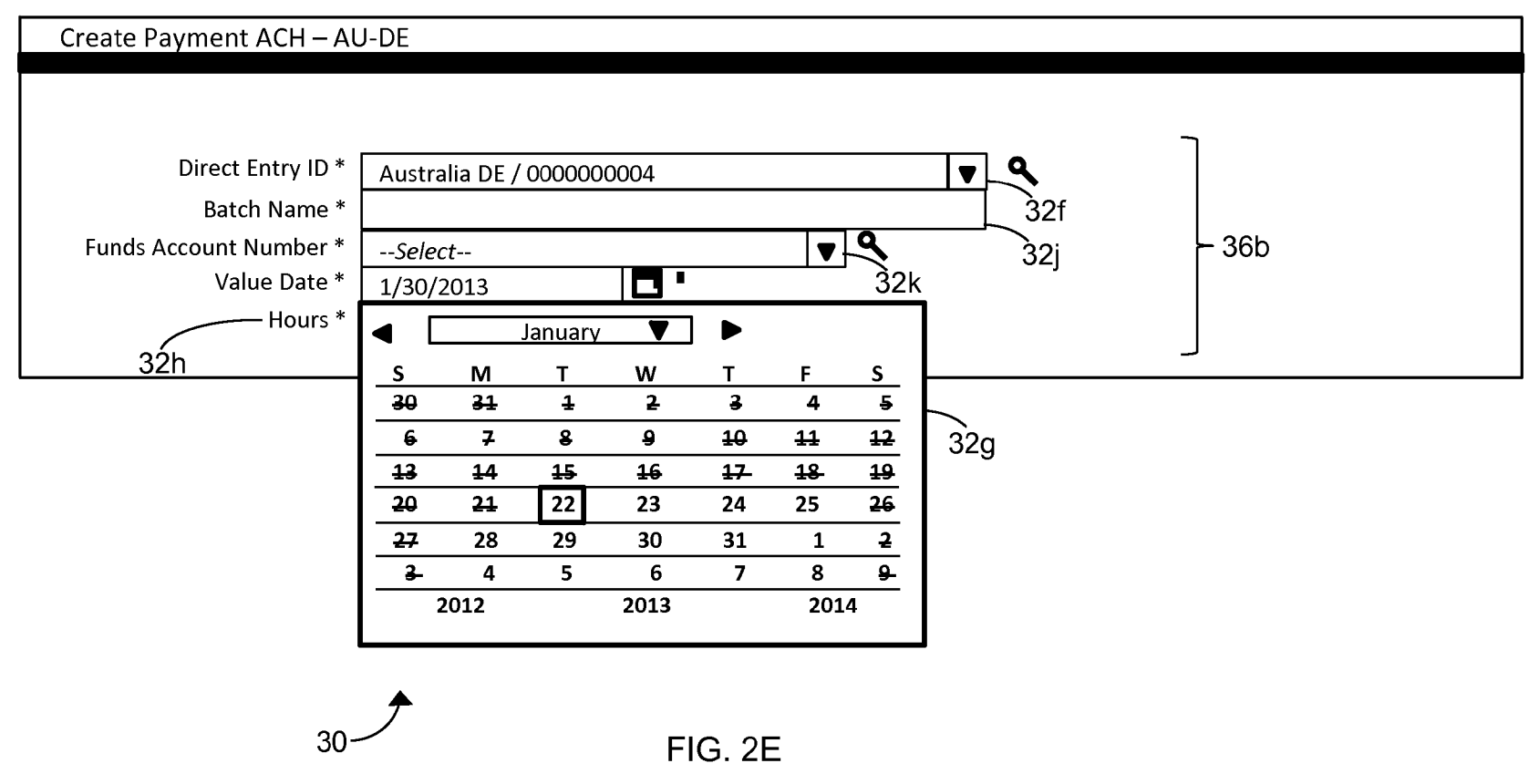

As depicted in the forms of FIGS. 2D and 2E, selectable clearing information contained in a clearing information field 32e, 32g may be updated. For example, in FIGS. 2D and 2E a drop down calendar 32e, 32g (respectively) contains selectable clearing information (i.e., dates). In FIG. 2D, after CA-EFT is selected as the clearing method, the form 30 in FIG. 2A is updated to include clearing information field 32e comprising a drop down calendar. The drop down calendar of clearing information field 32e allows the selection of weekend dates and dates prior to the current date (in this example, January 22), consistent with the CA-EFT clearing method. However, in FIG. 2E, after AU-DE is selected as the clearing method, the form 30 of FIG. 2A is updated to include clearing information field 32g comprising a drop down calendar. The drop down calendar of clearing information field 32g only allows the selection of weekdays (crossed out dates represent unselectable dates), including the current date (in this example, January 22) and future dates, in this case consistent with the AU-DE method.

The processor 26 may analyze the clearing information 24 received from the user in relation to the at least one clearing information field 32 by applying at least one clearing information rule 50. Based on this analysis, the processor may dynamically update another of the clearing information fields 32. For example, the processor 26 may be configured to dynamically update the form 30 by applying each clearing information rule 50 that is applicable based on the received clearing information 24. Dynamically updating the form may include, e.g., adding a specified clearing information field 32, removing a specified information field 32, populating a specified clearing information field 32, modifying how clearing information 24 is entered into a specified clearing information field 32 (e.g., changing the specified clearing information field 32 to be a textbox, a drop down list, a drop down calendar, a checkbox, a radio button, etc.), or modifying selectable elements in a clearing information field 32 (e.g., only allowing the selection of future weekdays in a drop down calendar as opposed to future weekdays and weekends). Dynamically updating the form 30 may also include updating the clearing information fields 32 as the user enters clearing information 24. The network interface 27 may be configured to provide the dynamically updated form to the user and receive further clearing information 24.

For example, a form 30 as depicted in FIG. 2A may be presented to a user. The form 30 contains a single clearing information field 32 for receiving clearing information 24 relating to a clearing method. The user may initiate an electronic transfer within, e.g., Australia or Canada by entering "AU-DE" or "CA-EFT" in the clearing information field 32 respectively. Assuming that the user intends to initiate an electronic funds transfer in Canada, the user selects the clearing method as "CA-EFT". After the user enters CA-EFT in the clearing information field 32, the form 30 of FIG. 2A may be updated by the processor 26, based on the clearing information rules 50, to the form 30 of FIG. 2B. The updated form 30 of FIG. 2B may contain all of the clearing information fields 32 necessary to initiate an electronic funds transfer in Canada. That is, a clearing information rule 50 may specify the addition of clearing information fields 32 to receive the clearing information 24 required to perform an electronic funds transfer in Canada. A clearing information rule 50 may specify that if the clearing method is selected as CA-EFT, a new section 36a containing four clearing information fields 32a-32d is to be added to the form 30. Upon receiving clearing information 24 specifying that the clearing method was selected as CA-EFT, the clearing information rule 50 may be applied to the form 30 of FIG. 2A, resulting in the form 30 being updated to the form 30 of FIG. 2B.

Alternatively, the user may intend to initiate an electronic funds transfer in Australia. In this example, in the form 30 of FIG. 2A, rather than selecting the clearing method as "CA-EFT", the user may select "AU-DE" as the clearing method. In this case, the form 30 of FIG. 2A may be updated to the form 30 of FIG. 2C. The updated form 30 of FIG. 2B may contain all of the clearing information fields 32 necessary to initiate an electronic funds transfer to a bank in Australia. A clearing information rule 50 may specify that if the clearing method is selected as AU-DE, a new section 36b containing four clearing information fields 32e-32j is to be added to the form 30. That is, a clearing information rule 50 may specify the addition of clearing information fields 32 to receive the clearing information 24 required to perform an electronic funds transfer in Australia. Upon receiving clearing information 24 specifying that the clearing method was selected as AU-DE, the clearing information rule 50 may be applied to the form 30 of FIG. 2A, resulting in the form 30 being updated to the form 30 of FIG. 2C.

As will be understood by one of ordinary skill in the art, the processor 26 may have various implementations. For example, the processor 26 may include any suitable device, such as a programmable circuit, integrated circuit, memory and I/O circuits, an application specific integrated circuit, microcontroller, complex programmable logic device, other programmable circuits, or the like. The processor 26 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor 26. Based on this disclosure, one of ordinary skill in the art would understand how to program the processor 26 to perform the steps described herein.

The network interface 27 may be communicatively coupled to the client system 14 and the primary financial services system 22 over, e.g., an open network (such as the Internet), a private network (such as a virtual private network), or any other suitable network. The network interface 27 may be configured to provide the form 30 to the user and receive clearing information 24 and primary system defined values 52 from the client system 22 and/or the primary financial services system 22.

As will be understood by one of ordinary skill in the art, the network interface 27 may comprise a wireless network adaptor, an Ethernet network card, or any suitable device that provides an interface between the system 22 and a network.

Figure 3:
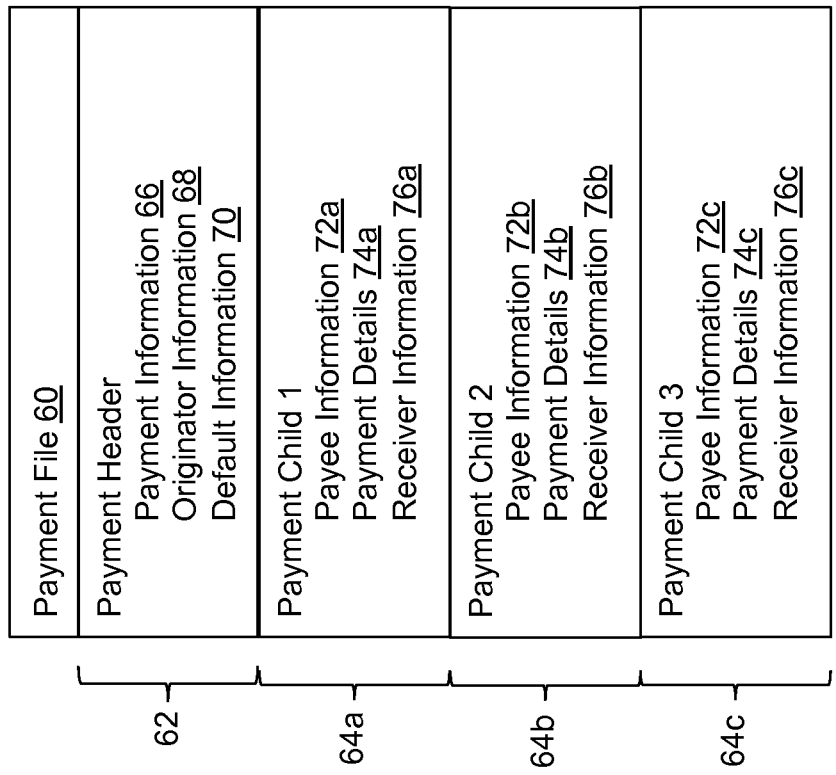
FIG. 3 is a schematic diagram depicting a payment file.

Turning to FIG. 3, the received clearing information 24 may be stored in the database 29. The clearing information 24 may be stored as payment files 60. Each element of received clearing information 24 may correspond to an element of required information relating to a particular global electronic funds transfer. Each payment file 60 may correspond to a global electronic funds transfer (e.g., a batch funds transfer) and may include a payment header 62 and at least one payment child 64. The clearing information 24 included in the payment header 62 may correspond to clearing information 24 that applies to each payment child 64a, 64b, 64c of the payment file 60.

For example, for a given payment file 60, the given payment file 60 may include clearing information 24 designating a foreign country. The clearing information 24 contained in the given payment file 60 may include all of the information required to initiate an electronic funds transfer to a bank in the foreign country.

For example, as depicted in FIG. 3, a payment file 60 may correspond to a batch funds transfer from an originator to multiple beneficiaries. The clearing information 24 relating to the originator (e.g., may include payment information 66, originator information 68, and default information 70) may be included in the payment file header and may be the same for each beneficiary in the batch funds transfer. However, the clearing information 24 relating to each beneficiary (e.g., payee information 72, payment details 74, and receiver information 76) may be different for each beneficiary and may be included in a separate payment child 64*a*, 64*b*, 64*c* of the payment file 60.

Figure 4A:
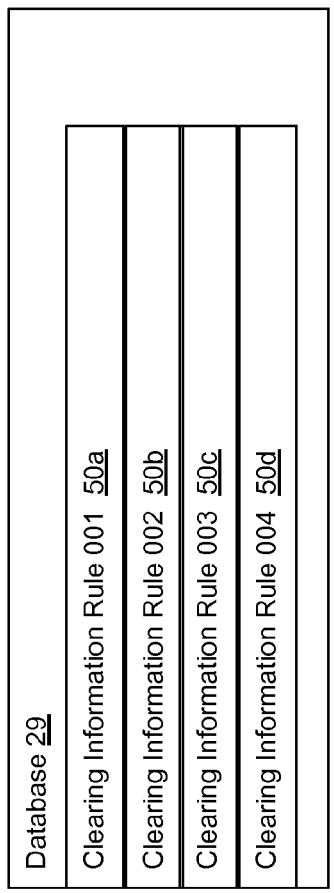
Figure 4B:
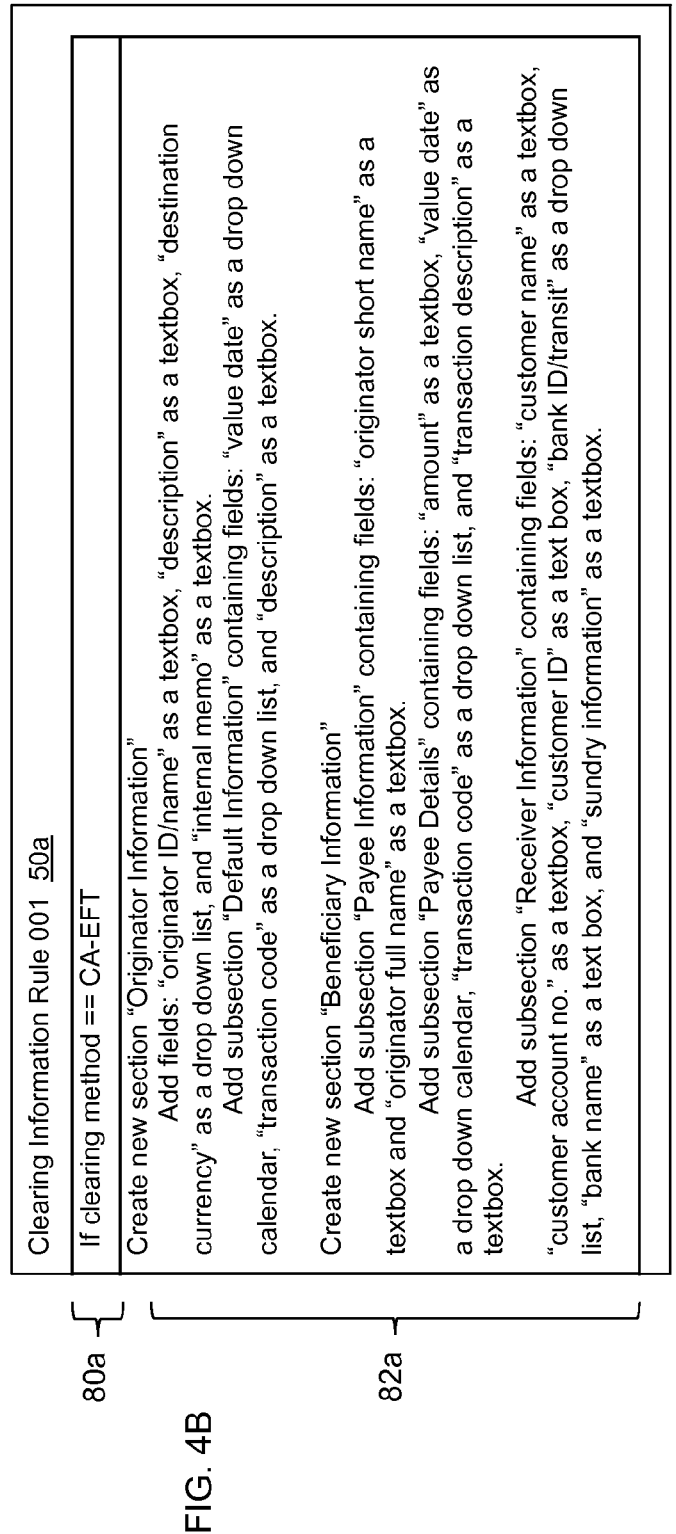

With reference to FIGS. 4A-4C, the at least one clearing information rule 50 may also be stored in the database 29. The database 29 may include multiple clearing information rules 50. For example, in FIG. 4A, the database 29 includes four clearing information rules 50*a*, 50*b*, 50*c*, 50*d*. An exemplary clearing information rule 50 may specify, for a given country, updating the form 30 to include clearing information fields 32 for receiving all of the clearing information 24 required to initiate an electronic transfer to a bank in the given country. Each clearing information rule 50*a*, 50*b*, 50*c*, 50*d*, may include a Boolean statement 80 that, if true, results in the application of an action statement 82. For example, in FIG. 4B, clearing information rule 001 50*a* is shown. In the clearing information rule 50*a*, the Boolean statement 80*a* is defined as "if clearing method=CA-EFT". If the Boolean statement 80*a* is true (i.e., if the clearing method is CA-EFT), then the action statement 82*a* is performed. Similarly, in FIG. 4C, clearing information rule 002 50*b* is shown. In the clearing information rule 50*b*, the Boolean statement 80*b* is defined as "if clearing method=AU-DE". If the Boolean statement 80*b* is true (i.e., if the clearing method is AU-DE), then the action statement 82*b* is performed.

As will be understood by one of ordinary skill in the art, the clearing information rules 50 are not limited to a format comprising a Boolean statement and an action statement, but may take any suitable form.

As will be understood by one of ordinary skill in the art, the database 29 may describe a data structure which embodies groups of records or data elements stored in a volatile or non volatile storage medium and accessed by an application, which may be instructions coded to a storage medium and executed by a processor. The database 29 may comprise multiple individual databases stored on the same storage medium or on multiple different storage media. The system 22 may also store data in and access the database 29. While the database 29 is depicted as a component of the global electronic funds payment system in FIG. 1, the database 29 could alternatively be stored on a separate server or computer.

The client system 14 may comprise systems with a known operating system (not shown), known IP networking hardware and software (not shown), and a known secure hypertext transport protocol (e.g. HTTPS) client such as a web browser for establishing and maintaining, through an internet connection provided by an Internet Service Provider (not shown) secure (e.g. HTTPS) connections to servers with an exposed URL. The client system 14 may also include a display 15 for displaying the form 30 to the user and an input 17 for inputting clearing information 24 into the clearing information fields 32 by the user. The display 15 may comprise a monitor, a television, a tablet, a smart phone, or any other suitable object for displaying the form 30 to a user. The input 17 may comprise a keyboard, a touchscreen, a mouse, or any other suitable object for entering information into the clearing information fields 32.

In general, the primary financial services system 22 may comprise traditional internet banking application architecture wherein a secure web application server 23 interfaces between the web server 22 and the bank's back end account management and transaction processing systems 90.

In more detail, data obtained from the back end account management systems 90 may be populated into web pages provided to the client system 14 and transactions initiated through a client system 14 may be validated by the secure web application server 23. Processes performed by the application server 23 enabling an authenticated user to access his/her accounts may be referred to as core functions.

For example, the account management and transaction processing functions (e.g. the core functions) supported by the secure web application server 23 may consist of: i) viewing account balances, ii) viewing/printing statements; iii) transferring funds between accounts; and iv) limited payment functions such as scheduling the printing and mailing of a check drawn on an account and/or initiating Automated Clearing House (ACH) debit and credit transactions to accounts held by other United States based financial institutions.

In order to perform a supplemental financial transaction that is not supported by the primary financial services system 16, the application server 23 may direct a web services client 87 to initiate a request 88 for the supplemental transaction to the supplemental financial transaction system 16.

As described above, supplemental financial transaction services are transactions that are not supported by the financial services system 22—i.e., the web application server 23 does not include applicable systems for, e.g., obtaining user input of transaction values, populating a transaction template, validating the transaction, and/or posting the transaction to the appropriate back end systems 90. For example, the supplemental financial transactions may include initiating wire payments.

The request 88 for the supplemental transaction may include primary system defined values 52 representing a portion, or subset, of the values required for the supplemental transaction 92. More specifically, the primary system defined values 52 may include the values controlled by the financial institution (i.e., not the user) that are required to create a validated transaction of the type for which the method call was initiated. For example, in a case wherein the supplemental financial transaction is an ACH payment in a foreign country, the user's account number could be a value controlled by the financial institution.

In response to receiving the transaction request 88, the supplemental financial transaction system 16 may: i) assign a unique redirect URL 94 to the transaction request 88; ii) store, in association with the unique redirect URL 94, the primary system defined values 52 provided in the request 88; and iii) return the unique redirect URL 94 to the primary financial services system 22 in a response 96 to the request 88.

After receiving the response 96 to the transaction request 88, the primary financial services system 22 may provide a supplemental transaction web page 100 to the client system 14 through the secure session 30. The supplemented transaction web page 100 may comprise a supplemental transaction frame 102 and, in association with the supplemental transaction frame 102, the unique redirect URL 94.

The global electronic funds payment system 22 provides a supplemental transaction web document object 106 for rendering within the supplemental transaction frame 102. The supplemental transaction web document object 106 may include the form 30 for accepting clearing information 24. The form 30, as described above, includes clearing information fields 32, with each clearing information field 32 configured to accept an element of clearing information 24.

The supplemental transaction web document object 106 may also include: i) the primary system defined values 52; ii) a script for rendering at least a portion of the primary system defined values 52 (in a locked or otherwise unchangeable field); iii) a script for rendering the form; iv) and a script for rendering controls for obtaining user entry of clearing information 24 in the clearing information 24 fields of the form. The supplemental transaction web document object 106 may be displayed in accordance with a look and feel matching that of web pages provided by the primary financial services system 22.

The global electronic funds payment system 22 receives the clearing information 24 entered (e.g., by the user) into the clearing information fields 32 and may store the clearing information 24 in the database 29.

For example, returning to FIGS. 5A and 5B, assume the database 29 contains the clearing information rules 50 depicted in FIGS. 4A-4C and the system 22 receives clearing information 24 indicating that CA-EFT was selected as the clearing method. The processor 26 may analyze the received clearing information (i.e., ACH, Cash Concentration/Disbursement, and CA-EFT) in relation to the clearing information fields 32a, 32b, 32c by applying the clearing information rules 50a, 50b, 50c, 50d. Based on the analysis, the processor 26 applies clearing information rule 50a. Clearing information rule 50a (FIG. 4B) is applied, because the Boolean statement 80a is true for the received clearing information 24 and the clearing information fields 32 that accepted the clearing information 24. Clearing information rule 50b (FIG. 4C) is not applied, because the Boolean statement 80b is not true—i.e., clearing method does not equal AU-DE. Assume for this example that clearing information rules 003 50c and 004 50d are similarly not applicable. Applying clearing information rule 50a to the form 30 of FIG. 5A, results in the updating of the form 30 to the form 30 shown in FIG. 5B.

In FIG. 5B, the form 30 of FIG. 5A has been updated as described in the action statement 82a of rule 0001 80a to include two new sections: "Originator Information" 68 and "Beneficiary Information" 64. The "Originator Information" section 68 contains multiple clearing information fields and a subsection "Default Information" 70 that contains additional clearing information fields. Any clearing information 24 entered by the user into the clearing information fields 32 in the section "Originator Information" 68 may correspond to clearing information 24 that is included in the payment header 62 of the associated payment file 60. The "Beneficiary Information" section 64 includes three subsections: "Payee Information" 72, "Payee Details" 74, and "Receiver Information" 76. Each of the three subsections contain multiple clearing information fields 32. Any clearing information 24 entered by the user into the clearing information fields 32 under the section "Beneficiary Information" 64 may correspond to clearing information 24 that is included in the one or more payment children 64 of the associated payment file 60.

In an alternative example, FIG. 5C depicts the updated form if clearing method AU-DE is selected in FIG. 5A. In this example, assume the only received clearing information 24 indicates that AU-DE was selected as the clearing method. The processor 26 may analyze the received clearing information (i.e., ACH, Cash Concentration/Disbursement, and AU-DE) in relation to the clearing information fields 32 by applying the clearing information rules 50a, 50b, 50c, 50d. Based on the analysis, the processor 26 applies clearing information rule 50b. Clearing information rule 50b (FIG. 4C) is applied, because the Boolean statement 80b is true for the received clearing information 24 and the clearing information fields 32 that accepted the clearing information 24. Clearing information rule 50a (FIG. 4B) is not applied, because the Boolean statement 80a is not true—i.e., clearing method does not equal CA-EFT. Assume for this example that clearing information rules 003 50c and 004 50d are similarly not applicable. Applying clearing information rule 50a to the form 30 of FIG. 5A, results in the updating of the form 30 to form 30 of FIG. 5C.

As described previously, the clearing information 24, e.g., may relate to payment information, originator information, default information, and beneficiary information. The payment information may include payment method, a payment type, and a clearing method. The clearing method may comprise Canadian Electronic Funds Transfer (EFT), Australian Direct Entry, New Zealand Bulk Electronic Clearing System (BEGS), United Kingdom (UK) Bankers' Automated Clearing Services (Bacs), or UK Faster Payments. The originator information may include, e.g., at least one of an originator ID/name, an originator description, a DD code, a direct entry ID, a value date, hours, a batch name, a funds account number, a funds account name, a dishonours account number, a dishonours account name, a funds BSB, a funding method, a destination currency, a reporting method, a statement reference, a statement narrative, and an internal memo. The default information may include, e.g., at least one of an originator code, originator particulars, an originator reference, a payee code, payee particulars, a payee reference, a transaction code, a transaction description, a date, a transaction code, a transaction description, a remitter name, a trade account number, a trade account name, a trace BSB, a lodgement reference, and a default description. The beneficiary information may include payee information.

After receiving the clearing information 24, the global electronic funds payment system 22 may implement a global electronic funds transfer based on the clearing information 24. Implementing the global electronic funds transfer may comprise providing the clearing information 24 to a bank's transaction processing system for performing the global electronic funds transfer based on the clearing information. The electronic funds transfer may, e.g., comprise an ACH payment or a wire transfer.

Figure 6:
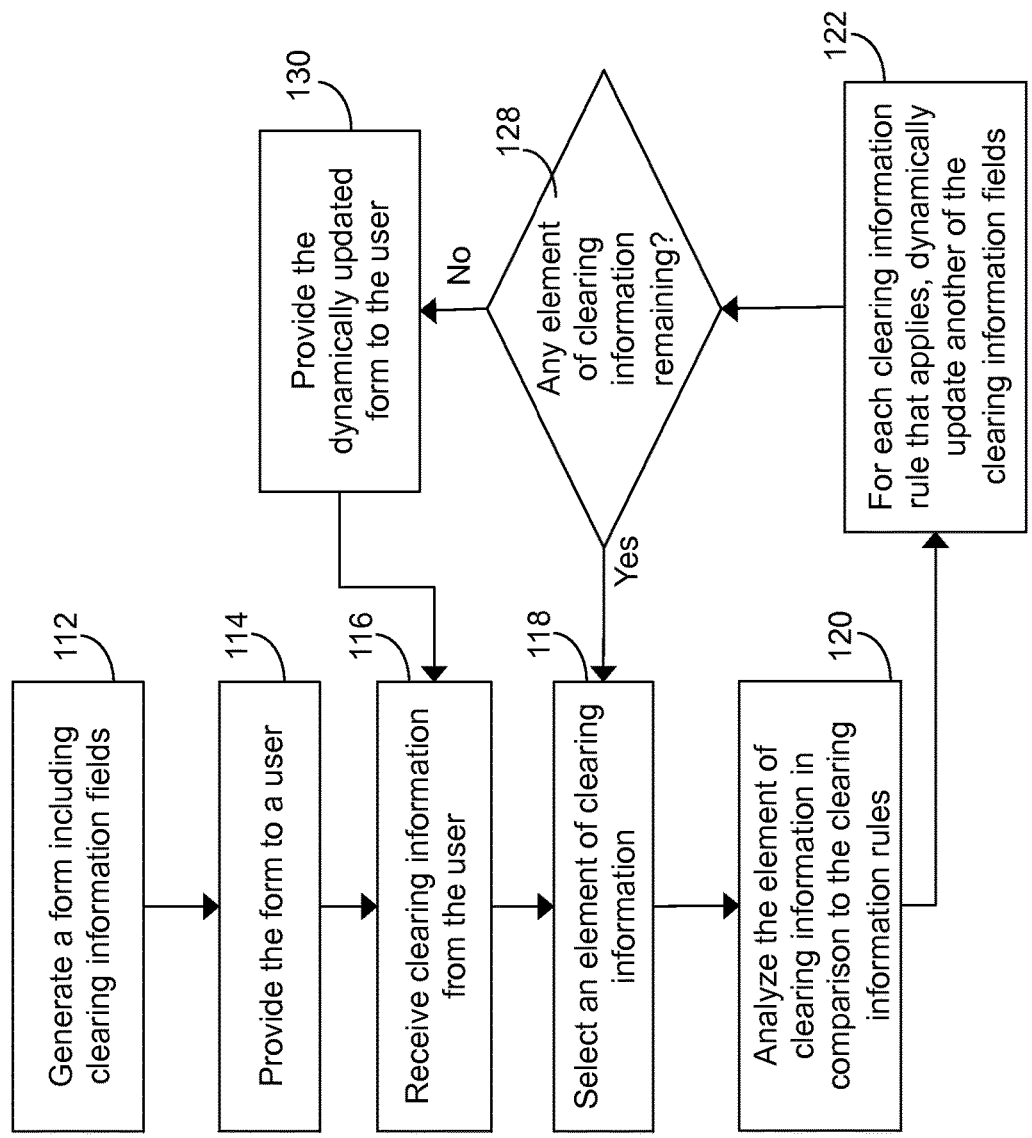
FIG. 6 is a block diagram depicting a method for receiving clearing information for implementing a funds transfer.

Turning to FIG. 6, exemplary method steps for receiving clearing information for implementing the funds transfer are shown. The steps may be performed, e.g., in response to a user making a request to perform a global electronic funds transfer. In process block 112, a form 30 is generated including clearing information fields 32. After the form 30 has been generated, in process block 114, the form 30 is provided to a user. The user may enter clearing information 24 into the clearing information fields 32 of the form 30. In process block 116, the clearing information 24 from the user is received. An element of the clearing information is selected in process block 118. In process block 120, the element of clearing information 24 in relation to the clearing information field 25 by applying the clearing information rules 50. In process block 122, another of the clearing information fields 32 (i.e., a clearing information field 32 that did not accept the clearing information) is updated dynamically.

In decision block 128, if any elements of clearing information 24 have not been analyzed, another element of clearing information 24 is selected. However, if all elements of clearing information 24 have been analyzed, in process block 130, the dynamically updated form 30 is supplied to the user.

It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A global electronic funds payment system for receiving clearing information for implementing a funds transfer, the clearing information comprising required information for performing the funds transfer, the system comprising:
   a processor configured to generate a user interface for accepting clearing information, the user interface including clearing information fields, each clearing information field configured to accept clearing information;
   a network interface operatively coupled to the processor and configured to provide the user interface to a user and receive the clearing information from the user, wherein the clearing information includes a selected clearing method;
   a database operatively coupled to the processor and encoded to a non-transitory computer readable medium, the database including at least one clearing information rule defining a relationship between at least one of the clearing information fields and the clearing information received from the user, wherein the at least one clearing information rule includes a selected clearing method rule specifying the addition of at least one specified clearing information field to the user interface for accepting the clearing information required to perform the funds transfer according to the selected clearing method;
   the processor further configured to analyze the clearing information received from the user in relation to the at least one clearing information field by applying the at least one clearing information rule, and based thereon dynamically update another of the clearing information fields, wherein the processor applies the selected clearing information rule, resulting in the addition of the at least one specified clearing information field to the user interface for accepting the clearing information required to perform the funds transfer according to the selected clearing method; and
   the network interface further configured to provide the dynamically updated user interface to the user and receive further clearing information.

2. The global electronic funds payment system of claim 1, wherein dynamically updating the user interface comprises at least one of removing a specified clearing information field from the user interface and adding the specified clearing information field to the user interface, wherein the specified clearing information field is set forth by the at least one clearing information rule.

3. The global electronic funds payment system of claim 2, wherein:
   the at least one clearing information rule includes a populating clearing method rule specifying information for populating the specified clearing information field based on the received clearing information;
   dynamically updating the user interface further comprises populating the specified clearing information field with the information specified by the populating clearing method.

4. The global electronic funds payment system of claim 1, wherein:
   the clearing information fields are grouped into sections, dynamically updating the user interface comprises adding a specified clearing information field to the user interface, and new sections are added to the user interface as the specified clearing information field is added; and
   the new sections added to the user interface are specified by the at least one clearing information rule.

5. The global electronic funds payment system of claim 1, wherein the clearing information fields are grouped into sections related to at least one of payment information, originator information, default information, beneficiary information, payee information, payment details, and receiver information.

6. The global electronic funds payment system of claim 1, wherein a user enters clearing information in a given clearing information field using at least one of a drop down list, a drop down calendar, a text box, a check box, and a radio button.

7. The global electronic funds payment system of claim 6, wherein dynamically updating the user interface comprises modifying how the user enters clearing information in the given clearing information field.

8. The global electronic funds payment system of claim 6, wherein dynamically updating the user interface comprises modifying selectable clearing information available in a given clearing information field.

9. The global electronic funds payment system of claim 1, the clearing information additionally including at least one of payment method, or payment type.

10. The global electronic funds payment system of claim 9, the selected clearing method including at least one of Canadian Electronic Funds Transfer (EFT), Australian Direct Entry, New Zealand Bulk Electronic Clearing System (BECS), United Kingdom (UK) Bankers' Automated Clearing Services (Bacs), and UK Faster Payments.

11. The global electronic funds payment system of claim 1, wherein the system implements an electronic funds transfer based on the clearing information.

12. The global electronic funds payment system of claim 1, wherein the network interface provides the clearing information to a bank's transaction processing system for performing an electronic funds transfer based on the clearing information.

13. The global electronic funds payment system of claim 1, wherein the funds transfer is an Automated Clearing House (ACH) payment.

14. The global electronic funds payment system of claim 1, wherein the user interface comprises a user interface displayed to a user.

* * * * *